United States Patent [19]
Reeve

[11] 3,764,884
[45] Oct. 9, 1973

[54] VOLTAGE TO TIME CONVERSION APPARATUS FOR AN ELECTRICAL CONVERTER

[75] Inventor: John Reeve, Waterloo, Ontario, Canada

[73] Assignee: Westinghouse Canada Limited, Hamilton, Ontario, Canada

[22] Filed: Oct. 30, 1972

[21] Appl. No.: 301,972

[52] U.S. Cl. .................... 321/9 A, 321/5, 307/106, 307/265
[51] Int. Cl. .......................................... H02m 1/12
[58] Field of Search ................... 321/5, 18, 27, 9 A; 307/106, 265

[56] References Cited
UNITED STATES PATENTS

| | | | |
|---|---|---|---|
| 3,176,213 | 3/1965 | Klees | 307/106 X |
| 3,458,795 | 7/1969 | Ainsworth | 321/5 |
| 3,466,525 | 9/1969 | Ainsworth | 321/5 |
| 3,474,321 | 10/1969 | Ainsworth | 321/5 |
| 3,514,689 | 5/1970 | Giannamore | 321/5 |
| 3,559,028 | 1/1971 | Studtmann et al. | 321/9 A |
| 3,585,488 | 6/1971 | Gutt et al. | 321/18 X |
| 3,609,507 | 9/1971 | Beck | 321/5 |
| 3,701,938 | 10/1972 | Chadwick | 321/5 X |
| 3,710,229 | 1/1973 | Jessee | 321/9 A |

Primary Examiner—William M. Shoop, Jr.
Attorney—R. H. Fox et al.

[57] ABSTRACT

This invention relates to a firing circuit control for prevention of premature firing of valves in a converter. The control circuit prohibits the firing of valves before a predetermined minimum firing angle.

3 Claims, 12 Drawing Figures

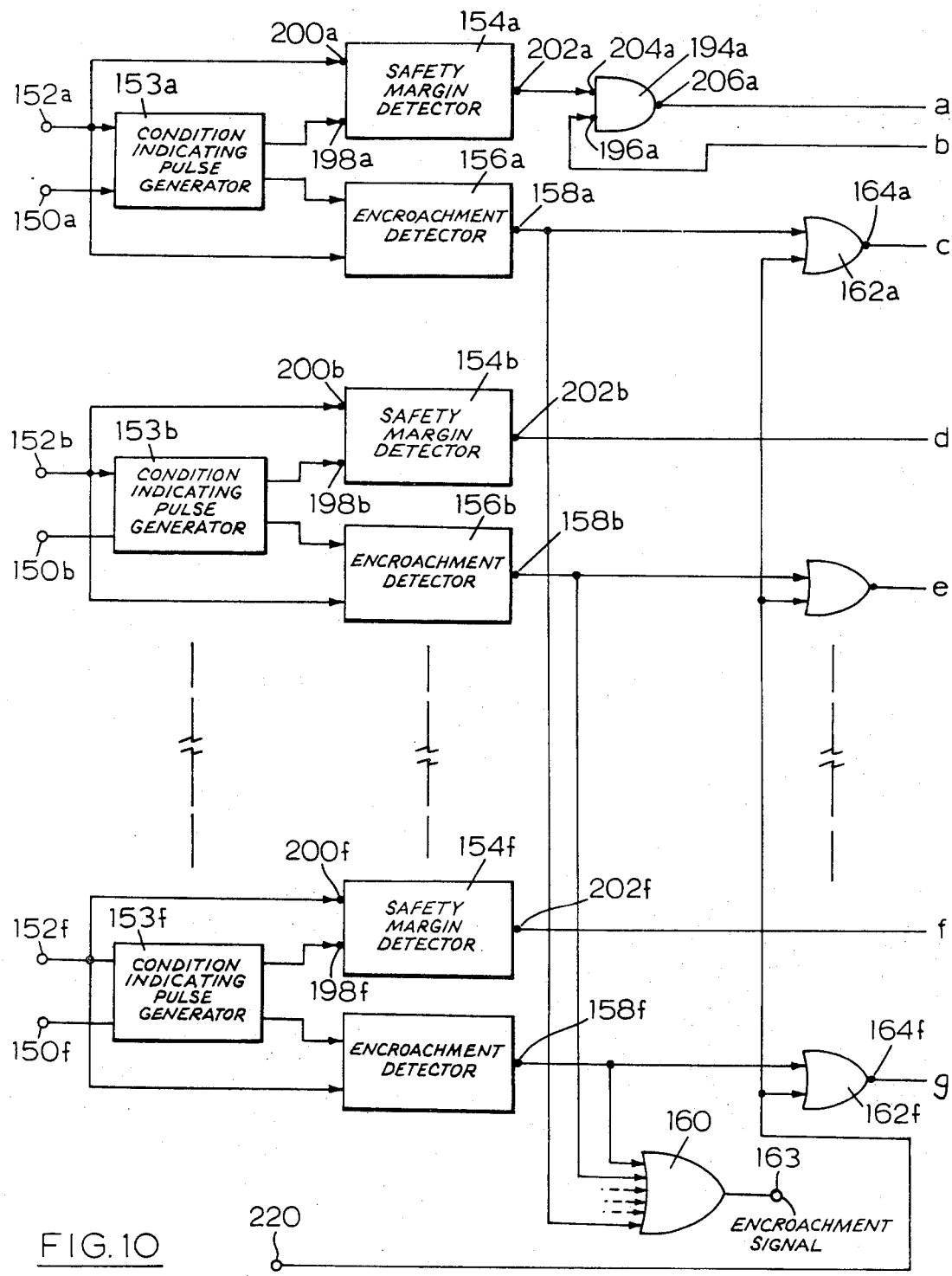
FIG.10 (part one)

(part two)

3,764,884

VOLTAGE TO TIME CONVERSION APPARATUS FOR AN ELECTRICAL CONVERTER

This invention is directed to a control system for static electrical conversion apparatus. Although this apparatus may be employed in conjunction with many types of electrical equipment where conversion of electrical energy is required, such as rectifiers, inverters, frequency changers, this disclosure will describe conversion apparatus which is suitable for operation at either end of a high voltage direct current transmission line. The basic conversion element of this system is a bridge of valves which must be triggered in an exact sequence to convert electrical energy from alternating current energy to direct current energy or vice versa. The control system for initiating firing of the valves is composed of logic elements which may be arranged to accurately determine the instants at which the valves are pulsed into a conductive state. The control system will also function to adjust the position of the firing pulses for firing the valves in the bridge in response to certain predetermined circuit conditions.

BACKGROUND OF THE INVENTION

High voltage AC-DC converters for converting electrical energy at high voltage transmission line terminals to a different form of electrical energy have been used for some time. The elements used for performing the conversion of the energy have conventionally been mercury arc devices having a trigger or "make alive" electrode, but in recent years, changes in technology have led to the introduction of semiconductor thyristor valves which may be used to replace the mercury arc devices previously used. The trigger pulses used to initiate firing of the valves in the past have generally been derived from analog circuitry. The use of analog circuitry employed has successfully controlled the firing of valves in high voltage converters, however it is generally recognized that with such control, the converters could generate undesirable non-theoretical harmonic voltages and currents due to unequally spaced firing pulses. These undesirable voltages and currents tend to interfere with communication apparatus if left unattenuated and removal by expensive filtering equipment has been necessary.

Because of the extensive use of mercury arc rectifiers coupled to strong AC systems used in prior art converters, analog control circuits were generally found satisfactory to ignite the valves in the converter and to protect the valves from being damaged while operating under abnormal or fault conditions. The reason for this is that mercury arc rectifiers are quite rugged devices when compared to thyristors and control circuits for this type of valve were not called upon to perform some of the functions required of thyristor control circuits.

It is generally believed that the logic control system of the present invention may be advantageously used to fire the valves in prior art mercury arc converters and it is a further aspect of this invention to more accurately control the firing of the valves in critical areas of operation, i.e. in areas of valve commutation, then has been achieved heretofore.

PRIOR ART

U. S. Patents
No. 2,684,460   Busemann
No. 2,684,461   Busemann
No. 2,466,525   Ainsworth
No. 2,774,012   Lamm
No. 2,711,505   Hoover
No. 3,458,795   Ainsworth

SUMMARY OF THE INVENTION

The present invention relates to a control system for a converter which is capable of producing either direct current from alternating current or vice versa. The valves in the converter will be fired by a logical control system which employs a master clock or oscillator, the output oscillations of which are related to the AC line frequency. The timing of the firing of the valves in the converter is controlled by counting clock pulses into a counter and producing a ring counter advancing pulse after a predetermined number of clocking pulses have been counted into the counter. The ring counter acts as a distributor of timing signals for distributing the pulses eminating from the counter. Pulses from the ring counter are supplied to the firing gate logic of the converter valves. These pulses operate to produce the start of the next firing pulse to the valves in the converter.

Because of the particular manner of counting clock pulses in a counter and advancing a ring counter after a predetermined number of pulses have been counted in the counter, it will be seen that the spacing between firing pulses may be more accurately controlled than was heretofore possible. During operation of the converter, it may be necessary to change the timing of the pulses used to fire converter valves in order to operate under optimum conditions whilst responding to changes in the demand on the system. Changes in the firing angles of the converter valves may be required because of changes in voltage, current, power, or frequency. For convenience the preceding variables upon which control action is based will hereinafter be referred to as basic functions. It is understood that the control system may respond, to one or more or a combination of basic functions. A suitable monitoring device is used to monitor the particular basic function or functions which can cause a temporary change in the rate at which clock pulses are counted into the counter. This will change the firing angle of the next valve to be fired and, assuming that henceforth clock pulses are fed into the counter at a normal rate, i.e. the basic function calls for no further action, clock pulses will be fed into the counter at the normal rate and the firing pulses will be produced at equally spaced intervals by the action of the counter. Other control circuitry will also be described which prevents the excursion of the firing angle into certain areas because it may be impossible to reliably commutate the current from the valve to its successor if commutation does not take place in certain prescribed boundaries.

Before beginning this disclosure it would be convenient to define certain terms in order to clarify the subsequent description.

a. crossover pulse means a pulse of electrical energy which is produced at anytime when a pair of phase voltages equal one another.

b. firing angle α is the angle in electrical degrees at which a firing pulse is initiated after the referenced cross-over pulse to which a particular valve is associated.

c. α min is the minimum firing angle which will be permitted by the control circuit. Beyond this point the control circuit will function to prevent any advancement of the firing angle from α min.

d. extinction angle γ is the angle in electrical degrees between the end of conduction of a specific valve and the appropriate crossover pulse to which that particular valve is referenced.

e. Preset Extinction Angle Pulse or Delayed End of Commutation Pulse is an artificially created electric signal occurring at a selected time after the end of the conduction of a specific valve.

f. "Safety margin" is the angle in electrical degrees which exists between i. the appropriate α min and the associated firing pulse for a given valve to which the firing pulse is referenced or ii. the interval between the preset Extinction Angle Pulse and the appropriate crossover pulse to which the particular valve under consideration is referenced.

g. "Encroachment" exists when i. a firing pulse occurs before α min ii. a preset Extinction Angle pulse occurs after the occurrence of an appropriate crossover pulse to which a particular valve is referenced.

h. Basic function is the variable or variables in the system which are being controlled, i.e. current, voltage, power frequency or some other suitable quantity.

Figure 1:
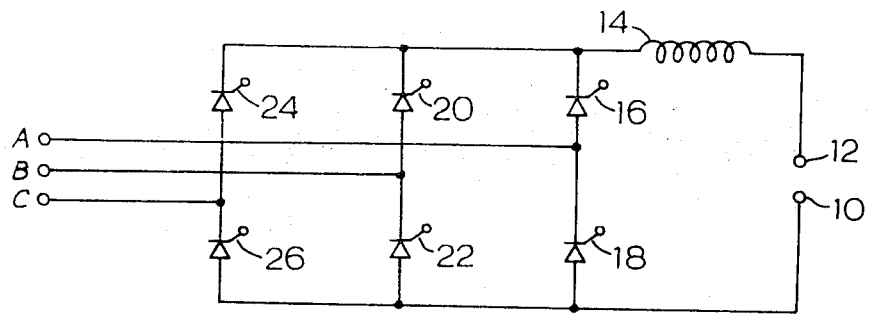
FIG. 1 is a circuit showing the basic connection of the valves in the converter.

Referring now to FIG. 1 a conventional three-phase converter is illustrated with AC energy being fed into terminals A, B and C and DC energy being fed into terminals 10 and 12. An inductor 14 is connected into one of the arms of the DC circuit and a series of valves 16 through 26 are connected as shown.

Although FIG. 1 illustrates a converter connected into a three-phase system, it will be understood by those skilled in the art that the control system about to be described will be applicable to an N-phase system. The valves are arranged to be fired sequentially in a logical manner by the control circuitry about to be described and provision must be made to monitor the operation of each valve. This may be accomplished by means of voltage and current transformers and it is not the object of this invention to set out in detail how the monitoring is accomplished.

Figure 2:
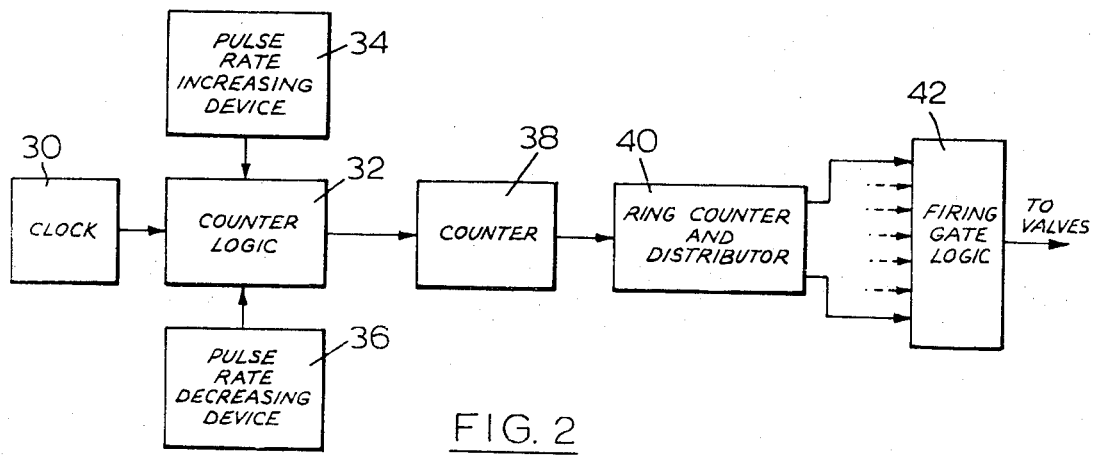
FIG. 2 is a simplified block diagram of the control system.

Referring now to FIG. 2, which is a simplified block diagram of the control system, a clock 30 which produces pulses of an essentially constant frequency is shown feeding pulses into counter logic 32. Also connected into counter logic 32 is a pulse rate increasing device 34 and a pulse rate decreasing device 36. Counter logic 32 is connected into counter 38, and the output from counter 38 is taken to ring counter and distributor 40. Ring counter and distributor 40 has a series of output leads which are connected into firing gates circuitry 42 of the valves of the converter. Under steady state conditions, the circuit functions as follows.

Clock 30 whose output is essentially a constant frequency but is tied to the line frequency, produces pulses which are fed into counter logic 32. Counter logic 32 supplies the pulses to counter 38. Counter 38 counts the pulses and after a specific predetermined number of pulses have been received produces an output pulse which will be referred to hereinafter as a ring counter advancing pulse which will advance ring counter 40 and produce an output to one of the terminals of firing gate logic 42 to initiate the start of the next firing pulse to the gate of the next converter valve to be fired.

Under certain conditions, the control circuit will cause pulse rate increasing device 34 to be gated into the control logic at which time additional clock pulses will be counted into counter 38 by counter logic 32. During this time additional pulses will be fed into counter logic 32 between the clock pulses and counter 38 will count its predetermined number of pulses sooner than it would have otherwise. Under this condition the ring counter will be advanced sooner, to produce a firing pulse to the firing gate logic at an earlier time than otherwise would have happened, had not device 34 been actuated.

Similarly, if the control circuit actuates the pulse rate decreasing device 36, clock pulses may be entirely eliminated or at least partially blocked for a predetermined period of time by counter logic 32 from being counted into counter 38. This has the effect of slowing down the rate at which clock pulses are counted into counter 38 and it in turn has the effect of delaying the issuance of a ring counter advancing pulse from counter 38 and subsequently ring counter and distributor 40 will receive the ring counter advancing pulse from counter 38 at a later time than otherwise would have been the case had clock pulses been counted from the clock 30 into the counter 38 at the normal rate. The pulse to the next firing gate logic circuitry will be delayed for a period of time proportional to the number of clock pulses which have been blocked. The relationship between clock frequency and a line frequency and the number of stages in the counter 38 will be discussed in detail in the following description.

Figure 3:
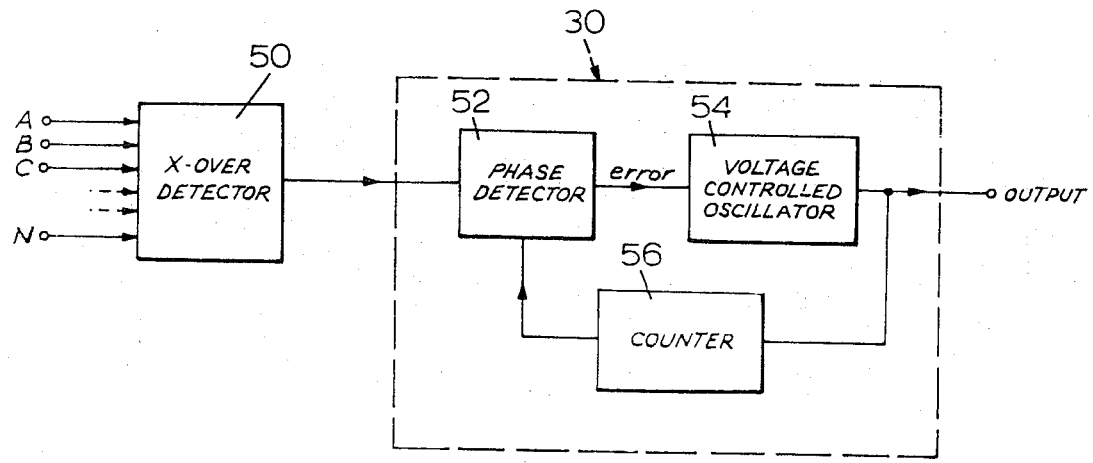
FIG. 3 is a block diagram of the control circuit for the voltage controlled oscillator.

Referring now to FIG. 3, the control circuit which may be used to produce and control the phase and frequency of the pulses produced in clock 30 will now be described.

A crossover detector shown as 50 is supplied with various phase voltages shown as A, B, C .......N which are fed into the crossover detector. The crossover detector produces a pulse each time any of the two phase voltages equal each other. Thus for an N-phase system the number of crossover pulses produced for each cycle of the alternating voltage will be 2N pulses, providing N is greater than two. The pulses produced in the cross-over detector 50 are fed into a phase detector 52, the output of which is taken into voltage controlled oscillator 54. The output of voltage controlled oscillator 54 is the same as the output of clock 30 and an output signal is connected into counter 56. Counter 56 counts the pulses being produced in voltage controlled oscillator 54 and after a predetermined number of pulses have been produced, produces an output pulse which is also fed into phase detector 52. Phase detector 52 compares the phase of the pulses received from counter 56 and the pulses received from crossover detector 50 and produces an error signal proportional to the phase difference between the signals produced in the crossover detector and the counter 56. The error signal is fed into the voltage controlled oscillator 54 to adjust its frequency. In this manner the output frequency of the voltage controlled oscillator is tied to the crossover pulses being produced by the various phase voltages and thus the output frequency of the voltage controlled oscillator 54 is directly tied to the line frequency supplying the phases of the converter. It will be noted that the elements shown inside the dotted line are the components of the clock 30.

Figure 4:
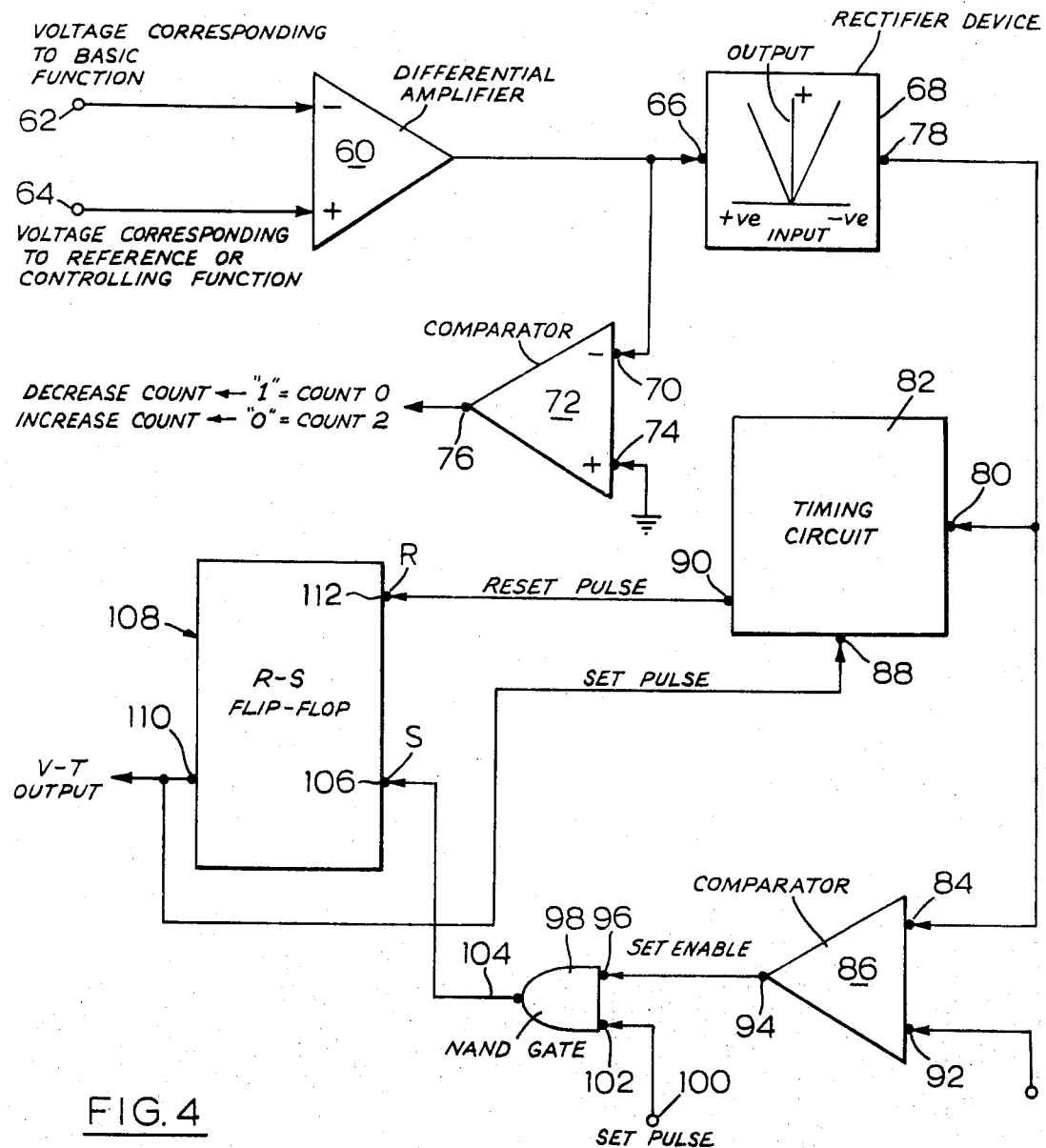
FIG. 4 is a block diagram of a part of the firing angle advance and retard circuit.

Referring now to FIG. 4 wherein the circuit utilized to vary the pulse rate of the clock pulses being counted into counter 38 is illustrated. This circuit for convenience will be referred to as a Voltage-Time Converter or a V-T converter. A differential amplifier 60 is shown having two inputs 62 and 64. A voltage corresponding to the basic function is fed into terminal 62. It will be remembered that the basic function may be a voltage signal corresponding to line current, phase voltage, line frequency or a signal proportional to the power being supplied by the converter. Simultaneously. a reference voltage signal is fed into terminal 64 of differential amplifier 60. The output of differential amplfier is fed into terminal 66 of rectifier device 68 and the termainal 70 of comparator 72. Comparator 72 also has a terminal 74 which may be connected to ground or other reference. Comparator 72 compares the polarity of the signal on terminal 70 with that on terminal 74 and produces an output signal on terminal 76 which changes in accordance with changes in polarity on terminal 70. For instance, if the input to terminal 70 is negative, comparator 72 will produce a logical one on terminal 76 indicating that a pulse rate decrease should be initiated so that the pulses being counted into counter 38 will be decreased in frequency or blocked as the case may be to delay the firing angle. If the signal on terminal 70 is positive a logical zero will be produced on terminal 76 indicating that a pulse rate increase should be undertaken by the control circuit of FIG. 2. This will have the effect of increasing the pulse rate of the pulses entering counter 38 and advancing the firing angle of the pulses.

The output of rectifier device 68 is taken from terminal 78 and it will be seen that the polarity of the signal being produced at terminal 78 is always the same, however the magnitude of the signal will be proportional to the absolute magnitude of the signal being fed into terminal 66. The signal being produced by rectifier device 68 is fed into terminal 80 of timing circuit 82 and also terminal 84 of comparator 86. Timing circuit 82 has a second input terminal 88 and an output terminal 90. It is the function of timing circuit 82 to produce a reset pulse on terminal 90 which is delayed in time from a set signal which will be fed into terminal 88, the set time being variable depending upon the magnitude of the input signal being fed into terminal 80. The signal being fed into terminal 84 of comparator 86 is compared with a signal on terminal 92 to determine if the signal on terminal 84 is of a greater magnitude than the signal on terminal 92. The signal on terminal 92 is of a predetermined level and is used to add deadband to the system, that is, to cause the system to delay in taking action unless the signal on terminal 84 is above a certain specified level. The output terminal 94 of comparator 86 is fed into terminal 96 of nand gate 98. A set pulse is fed into terminal 100 which is connected to input 102 of nand gate 98. The set pulse being fed into terminal 100 in this instance is based on the system operation and is timed to coincide with selected instants in the waveforms or other artificially derived instants associated with converter operation and can occur at either one or several occasions in a full cycle of the AC supply voltage. The output terminal 104 of nand gate 98 is connected into terminal 106 (set terminal) of RS flip-flop 108. RS flip-flop also has an output terminal 110 and a reset terminal 112.

The operation of the circuit is as follows. When the signal produced on terminal 62 differs from the signal produced on terminal 64, differential comparator 60 produces an output and comparator 72 produces a logical one or a logical zero depending upon the polarity of the output from differential amplifier 60. Rectifier device 68 produces a unipolar signal on terminal 78 which is proportional in magnitude to the signal on terminal 66. The signal from terminal 78 is fed into timing circuit 82 and into comparator 86 at terminal 84. If the signal fed into terminal 84 is greater than the signal being fed into terminal 92 of comparator 86 an output will be produced on terminal 94 which is fed into terminal 96 of nand gate 98. Under circumstances when no change in the firing angle is being made nand gate 98's output is a logical one. When comparator 86 produces a logical one output signal which is fed into terminal 96 the output of nand gate 98 will not change from a logical one, but when the system produces a set pulse on terminal 100 which is fed into terminal 102 of nand gate 98, while comparator 86 is producing a logical one output signal, a logical zero is produced on terminal 104. The logical zero is fed into set terminal 106 of RS flip-flop 108 which produces a logical one at output terminal 110 of RS flip-flop. The signal from terminal 110 acts as a set signal for timing circuit 82 and is fed into terminal 88. Timing circuit 82 then produces a reset pulse on terminal 90 which is delayed in time by an amount proportional to the magnitude of the signal on terminal 80 of timing circuit 82. Upon receiving the pulse on reset terminal 112 the output on terminal 110 of RS flip-flop resets to a logical zero.

It is seen that the circuit shown in FIG. 4 has two outputs, one from comparator 72 which produces a logical one or a logical zero depending on the polarity of the signal being produced in differential amplifier 60. Output terminal 110 of RS flip-flop 108 produces a pulse which is only produced if the signal produced in differential amplifier 60 is greater than a certain predetermined amount and the duration of the pulse produced on terminal 110 is of a length (when produced) corresponding to the magnitude of the signal being produced by differential amplifier 60. It will be seen that comparator 72 thus provides an indication of whether the pulse rate should be increased or decreased in the control circuit and the output from RS flip-flop 108 will dictate the length of time such action is to be taken, or if such action is to be taken. Terminal 110 only controls the length of time the corrective action is to take place. This concludes the description and operation of the Voltage-Time Converter (V-T Converter).

Figure 5:
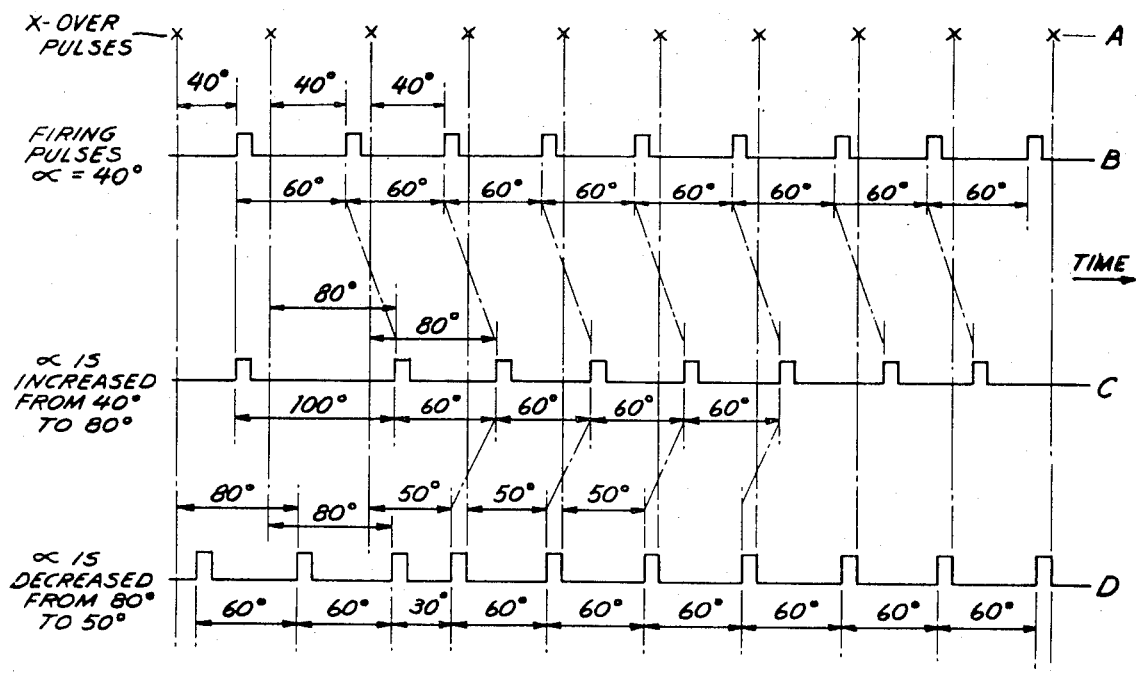
FIG. 5 is a diagram showing the spacing of the firing pulses and variations in the phase of the firing pulses which is produced by the control circuit.

Referring now to FIG. 5 wherein a graphical illustration of the firing pulses for a six pulse system is illustrated, it will be seen that graph A provides an indication of the occurrence of crossover pulses as produced in crossover detector 50 when the system is in operation. The crossover pulses are substantially equally spaced and the only difference in spacing which might occur between the crossover pulses will be due to slight frequency changes in the system as well as any non-symmetrical qualities in the phase voltages. The crossover pulses determine the output frequency of the clock 30 and assuming the system is in operation under steady state conditions, graph B shows the illustration of firing pulses being produced by the action of counter 38 which produces its ring counter advancing pulse at substantially equally spaced intervals of 60 electrical degrees. If for some reason, the basic function requires that the firing angle be delayed an additional 40°, then pulses issuing from clock 30 will be blocked or partially blocked for a period of time so that for example, no pulses from the clock 30 are counted into counter 38 until sufficient pulses have been removed to delay the firing angle by an additional 40° as shown in C. In practise, this action may take place over a period of time encompassing several firing pulses. In this instance, the blockage of pulses which would have normally occurred during 40 electrical degrees of the electrical system is shown to have taken place during the interval between the first and second pulse shown in FIG. 5C. During this interval where the adjustment and firing angle takes place the electrical angle between the pulses is 100°, however after the adjustment has taken place, the pulse spacing is maintained at 60° by means of counter 38.

If the basic function indicates that an advance in the firing angle is necessary extra pulses are counted into the counter 38 from device 34 through counter logic 32. In this instance, extra pulses are added by device 34 during the interval between the third and the fourth firing pulses. Counter 38 issues its ring counter advancing pulse 30° earlier electrically than does the case previously. This brings the firing angle to 50°. After the fourth pulse is produced, the firing angle remains constant at 50° and the interval between the firing pulses is maintained constant at 60°.

In order to determine the change in the firing angle in electrical degrees produced by the blockage of pulses the following relationship will be useful.

$$\Delta \alpha = (\text{No. of clock pulses blocked}) \times 360/(P \times 2^N)$$

where $\Delta \alpha$ = change in firing angle in electrical degrees.
$P$ = number of firing pulses per cycle of the system.
$N$ = number of stages of counter 38.

Of course the same relationship is true for the addition of pulses between clock pulses.

Up to now in the description, no mention has been made on the restriction of the excursions of the firing angle. However, it is well known that if the firing angle is adjusted too far in either direction from its proper operating firing point reliable commutation of the valves will be sacrificed. To prevent this, it is necessary to have a monitoring system which will monitor the excursions of the firing pulses and limit excursions within permissible operating ranges. If during operation the controlling function causes the control circuit to attempt to fire the valves too soon, particularly as might possibly happen during periods of rectification, the monitoring circuits will in fact take note of the early firing angle and in effect delay it a suitable amount so that reliable commutation will be maintained.

Figure 6:
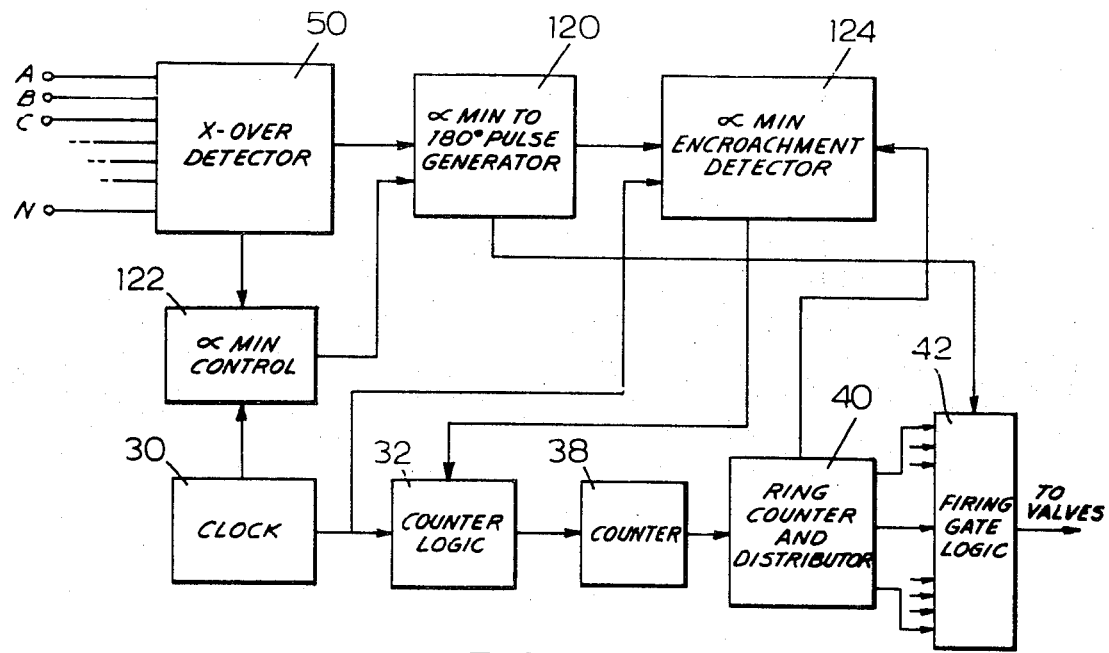
FIG. 6 is a block diagram of the α encroachment circuit.

FIG. 6 shows the $\alpha$ min control circuit. It will be seen that the crossove detector 50 is again utilized as a reference for producing pulses. The pulses produced therein are fed into $\alpha$ min to 180° pulse generator 120 and to the $\alpha$ min control 122. The clock 30 is arranged to feed pulses into the $\alpha$ min control 122 and the $\alpha$ min encroachment detector 124. Pulses from the $\alpha$ min control 122 are fed into the $\alpha$ min to 180° pulse generator 120 and the output from generator 120 is fed into $\alpha$ min encroachment detector 124 and firing gate logic 42. $\alpha$ min to 180° pulse generator produces a pulse which will extend in duration from $\alpha$ min to 180° beyond the crossover signal produced for the particular valve under consideration. This signal is fed into $\alpha$ min encroachment detector 124 and firing gate logic 42. A signal from the ring counter and distributor 40 is fed into the encroachment detector 124.

The circuit functions as follows. Under steady state conditions, the $\alpha$ min control receives pulses from the crossover detector 50 and the clock 30. The $\alpha$ min control generates pulses which are delayed from a crossover pulse by an angle $\alpha$ min. These are fed into the $\alpha$ min to 180° pulse generator. The pulse produced in the generator 120 has a duration of 180° minus the $\alpha$ min angle with $\alpha$ min being referenced from and begins at the appropriate crossover pulse. Under steady state conditions, pulses from the ring counter and distributor 40 will arrive at the $\alpha$ min encroachment detector in the duration of an $\alpha$ min to 180° pulse being fed into the encroachment detector 124 from the generator 110. As long as the leading edge of pulses from ring counter and distributor arrive during the $\alpha$ min to 180° pulse from generator 120 no corrective action will be taken by the circuit, because the firing pulses occur within an acceptable period. However should the control circuit attempt to advance the pulses issuing from the ring counter and distributor so that these pulses occur before the beginning of the $\alpha$ min to 180° pulse being generated in generator 120, the $\alpha$ min encroachment detector 124 detects the encroachment of a ring counter and distributor pulse in the $\alpha$ min time interval. The $\alpha$ min encroachment detector will immediately produce a signal which will prevent anymore clock pulses from entering counter logic 32 until the beginning of the $\alpha$ min to 180° pulse. This will delay the firing angle to avoid any further encroachment by the particular valve in question. In addition, because the $\alpha$ min to 180° pulse has not been received in the firing gates circuitry 42, firing of the particular valve in question cannot occur until the presence of the $\alpha$ min to 180° pulse. The circuitry provided includes an $\alpha$ min encroachment detector for each valve in the converter, and because of the departures in symmetry of the supply and the apparatus involved, the firing pulses for one particular valve will generally encroach on the α min period before the firing pulses of the balance of the valves in the system. When one particular α min encroachment detector detects encroachment, it in effect becomes an optional reference circuit on which is based the firing angles of the whole converter, of which more will be said later. The α min for this particular valve will in effect serve as a reference for the rest of the valves of the converter because its control will delay the counting action of counter logic 32 and because of the optional requirement of equal spacing of the firing pulses as dictated by the action of counter 38, the firing angles of the other valves will be tied to the most critical valve in the group. It will become apparent that if for some reason another valve should experience encroachment during operation it will become the reference and all other minimum firing angles will in effect be based on its operation in the circuit.

Figure 7:
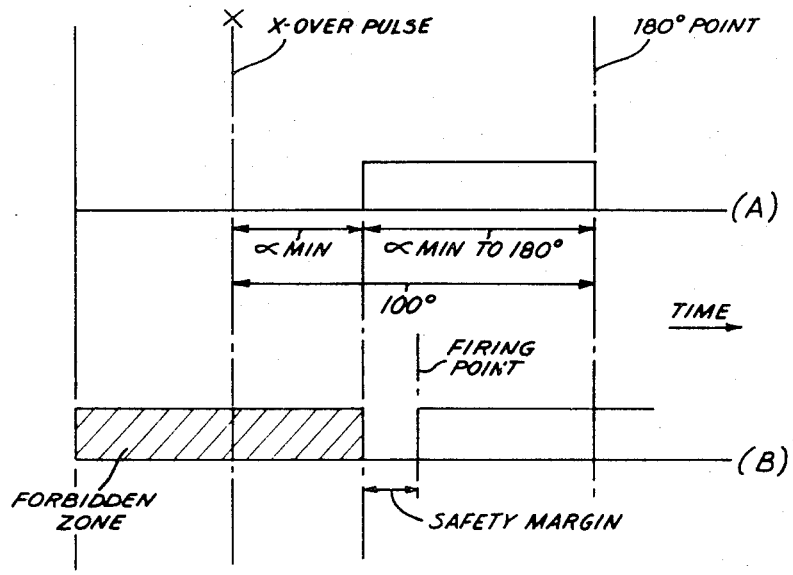
FIG. 7 is a diagram showing the time relationship of the firing pulses with the appropriate voltage crossover pulse.

FIG. 7 is an illustration of the action of the control circuit. Referring to FIG. 7A, the occurrence of a crossover pulse for a particular valve is used as a reference. The α min to 180° pulse is illustrated in FIG. 7A and this pulse is produced in generator 120. Referring to FIG. 7B, it will be noted that the firing point in this instance is illustrated to be within the α min to 180° pulse duration and hence a small safety margin exists.

Alternative modes for α min operation are available. The described action following encroachment may be permitted for any valve to increase the firing angle. The basic function will be permitted to decrease the firing angle for each valve so as to permit the firing of each valve, if demanded, at its individual α min point. Alternatively, following the encroachment of any firing point pertaining to one valve, that valve is designated as the reference valve. Any action of the basic function to decrease the firing angle towards renewed encroachment is permitted with respect to that valve only, until such time as the basic function demands an increase in firing angle, at which time all valves are designated reference valves in anticipation of future renewal of α min operation. By this second, optional method, the α min operation is generally with respect to one valve, its firing instant having shown itself to have the largest encroachment, with the remaining firing instant symmetrically displaced in time with firing angles the same or generally in excess of α min. The action of the basic function in attempting to reduce the firing angle for a designated reference valve may, by way of example, be effected through the action of the timing circuit 82 and, again by way of example, this circuit 82 can be set in operation at alternative selected instants such as the α min derived points, supply voltage crossover points or the points designating the beginning of the inverter safety margin region, of which more will be said later with reference to inverter operation.

Figure 8:
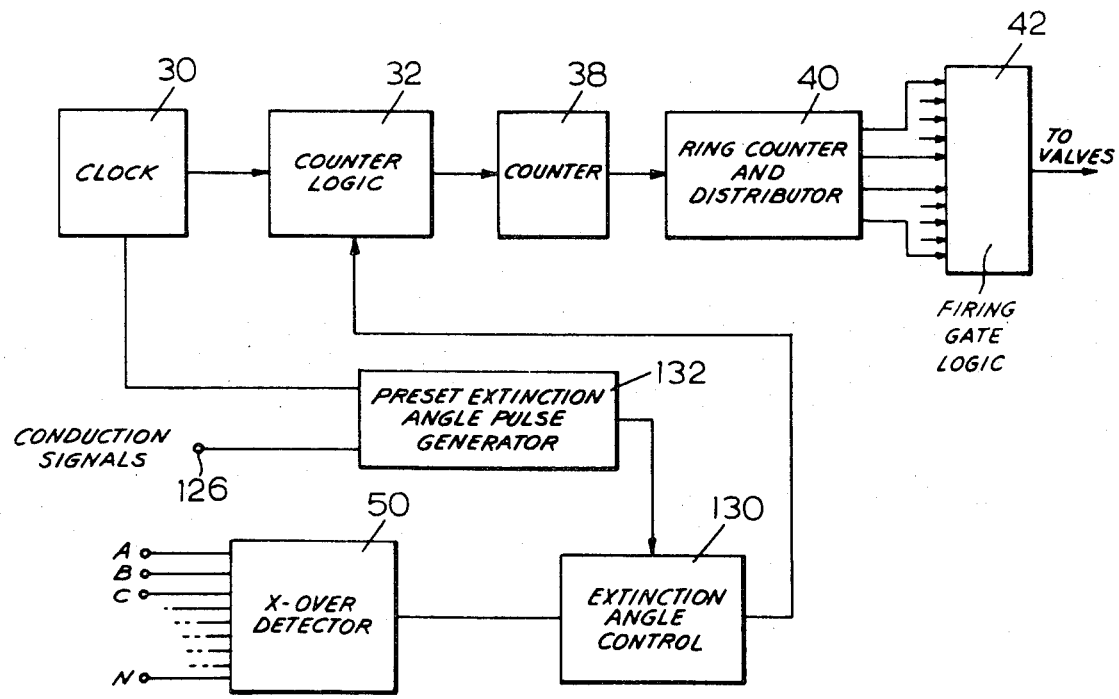
FIG. 8 is a block diagram of the γ encroachment control circuit.

In the inverter mode it is quite probable that under some operating conditions the control will attempt to fire the valves late in the cycle near the point where it is impossible to reliably commutate the valves. For this reason, it is necessary to control the actual angle of extinction of the valves in the converter and to do so of course requires adjustment of the firing angle of the next valve to be fired. In order to control the extinction angle of the valves, the control circuit of FIG. 8 will now be described.

Crossover detector 50 is again utilized to produce pulses at each voltage crossover of the phase voltages which pulses are fed into extinction angle control 130. The output of extinction angle control 130 is fed into counter logic 32. The clock 30 is used to provide pulses to counter logic 32 as well as to preset extinction generator 132. Current conduction signals are fed into terminal 126 which is connected to preset extinction angle generator 132. The current conduction signals are electrical signals which indicate that current is flowing in a particular valve of the converter. The output of the preset extinction angle generator 132 is taken to the extinction angle control 130 and because of the balance of the control circuit is the same as that shown in FIG. 6, it will not be described in detail.

The circuit functions as follows. The preset extinction angle generator receives an end of commutation signal from terminal 126 and produces a preset extinction angle pulse after a selected duration following the end of commutation. The delay will be determined according to various parameters in the system. The output from the preset extinction angle generator is taken to the extinction angle control 130 where it is compared with a preselected crossover pulse. If the preset extinction angle pulse occurs after the selected crossover pulse for the particular valve under consideration, an encroachment will be signalled by the extinction angle control which produces an output signal which is fed into counter logic 32 to simultaneously advance the firing angle for the duration of the encroachment.

By way of example the encroachment period can be derived within the extinction angle control 130 and in particular as part of the encroachment detector 156a by the following means. A pulse, designated a condition-indicating pulse as illustrated in FIG. 9B and 9D is derived commensing at the preset extinction angle pulse and terminated at a selected instant in the waveform shown as End Stop for Encroachment Measurement in FIG. 9D after the appropriate reference crossover point. The encroachment is registered from the same crossover point up to the beginning of the Condition-indicating pulse. The registered encroachment and the simultaneous modification to the counting action is limited to a maximum determined by the duration of the condition-indicating pulse, the termination of which (end stop) can be modified according to system operating conditions.

Under conditions where an encroachment has taken place, a similar control procedure to that described in detail previously where an encroachment of the minimum firing angle is experienced, that is, the valve undergoing encroachment is noted and recorded by the logic circuitry, so that in future all the firing angles of the valves in the converters is controlled by the extinction angle of the aforementioned noted valve. This will be discussed in detail in the ensuing description. Thus, if the control persists in attempting to delay the firing angle of the valves in the converter the control signal is permitted to delay the firing angle by the amount of the safety margin of the reference valve only at the same time that this safety margin is detected.

Figure 9:
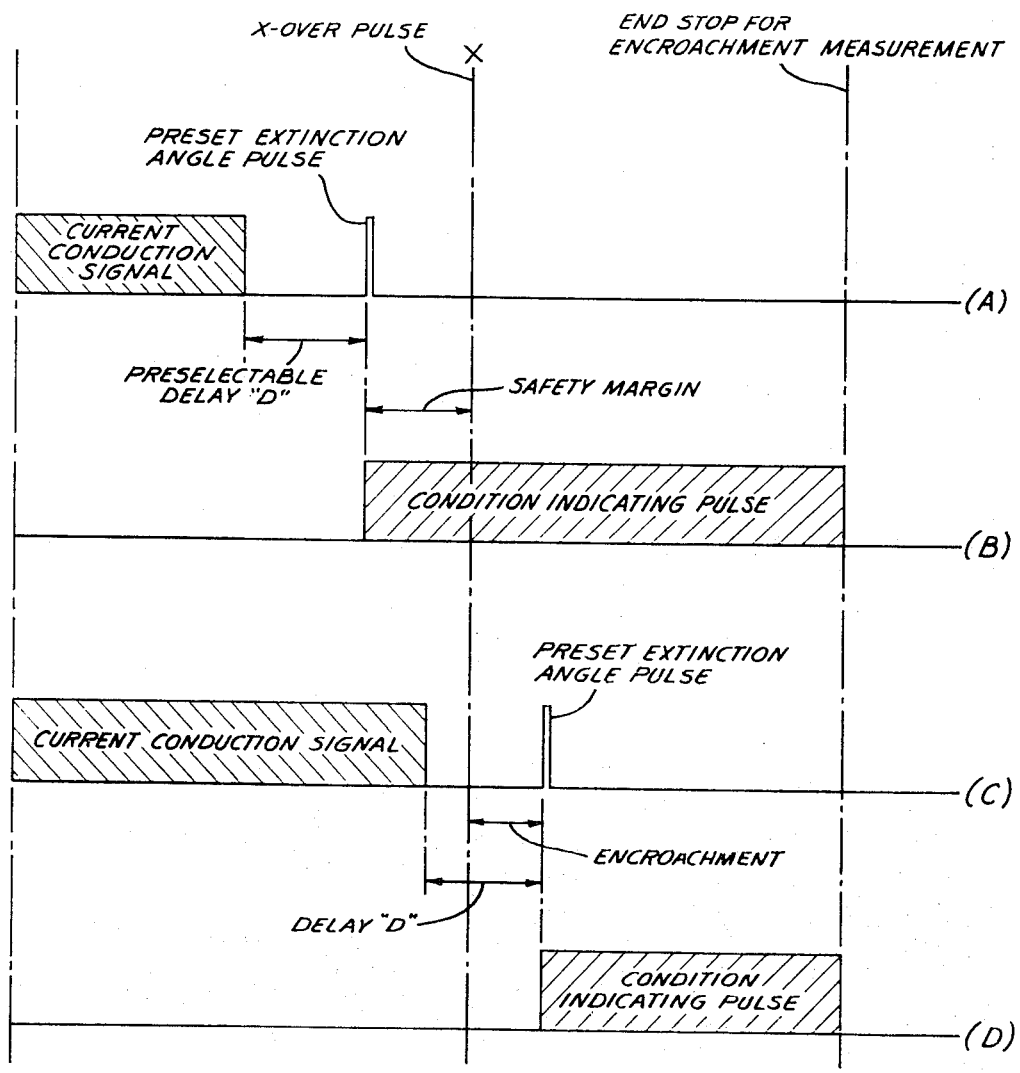
FIG. 9 is a diagram setting out the time relationship of the firing pulses with respect to the minimum extinction angle.

FIG. 9 is a graphical illustration of the action of the extinction angle control. Referring to FIG. 9A, it will be noted that the preset extinction angle pulse which is referenced from the current conduction signal occurs before the crossover pulse occurs. The angle between the termination of the preset extinction angle pulse and the crossover pulse is termed a safety margin. However when the control attempts to delay the firing of the valves in the converter such as illustrated in FIG. 9C, the preset extinction angle pulse occurs after the crossover pulse. This is encroachment of the conduction angle into a forbidden zone (for this particular valve) and it is this encroachment into the forbidden zone which stimulates the control circuitry into action to advance the firing angle of all the valves in the converter to avoid the encroachment that has been experienced by this particular valve and selects this valve as a reference valve.

The manner in which this selection is accomplished will now be discussed in detail with specific reference to FIG. 10 (A and B) which shows the particular method of selecting a reference valve under operating conditions where encroachment occurs. The specific example discussed here will be the extinction angle encroachment detector, but it will be found that this same circuit will function to provide a rectifier firing angle encroachment detector with very little modification after the extinction angle encroachment detector is discussed in detail.

Figure 10:
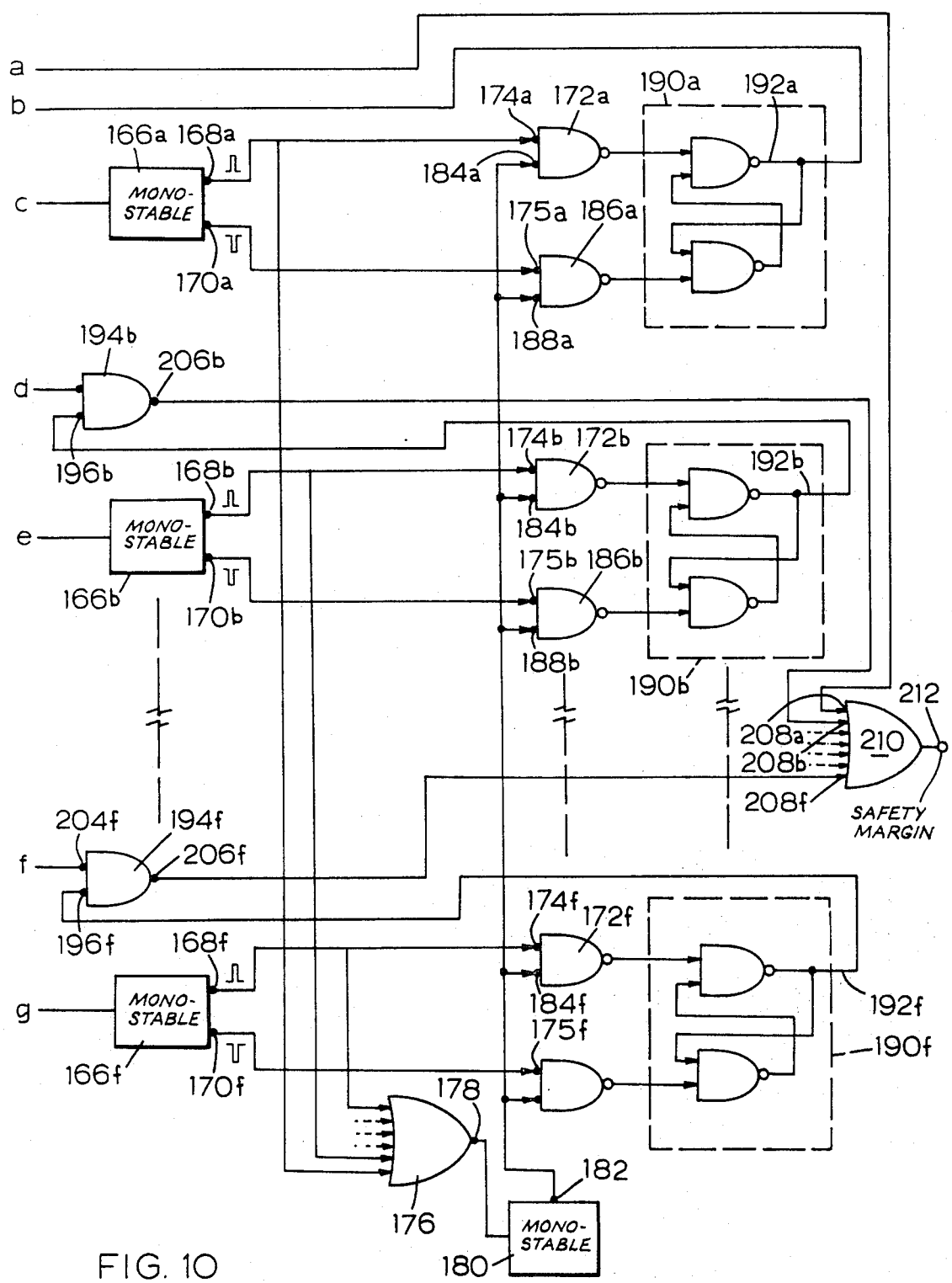
FIGS. 10A and 10B taken together illustrate the logic circuitry used for γ encroachment detection and the selection of a reference valve.

Referring now to FIGS. 10 (A and B) it will be seen that the preset extinction angle pulse is fed into terminals 150a, 150b.....150f (3 phase system) which corresponds to the pulse illustrated in FIGS. 9A and 9C.

The appropriate crossover pulse is fed into terminals 152a, 152b......152f. For extinction angle control the crossover pulse used will be the one beyond which it becomes difficult if not impossible to commutate the valve under consideration.

The signals from terminals 150a and 152a are fed into the condition indicating circuit 153a. Also the signal on terminal 152a are also fed into a pair of detector circuits 154a and 156a.

Detector 156a will produce an output pulse on terminal 158a if the condition indicating pulse does not begin before the referenced crossover pulse on terminal 152a. The duration of the output pulse on terminal 158a will begin at the referenced crossover pulse and exist until the beginning of the condition indicating pulse.

When an output pulse is produced on terminal 158a it is fed into or circuit 160 and or circuit 162a. Or circuit 160 produces an output on terminal 163 which may be used as a signalling or monitoring device to show that an encroachment has taken place somewhere in the system.

The signal supplied from terminal 158a to or circuit 162a causes or circuit 162a to produce an output pulse on terminal 164a which pulse is fed to monostable 166a.

Monostable 166a thence produces a positive pulse on output terminal 168a and a negative pulse on terminal 170a in response to the presence of a pulse from or circuit 162a.

The positive going pulse on terminal 168a is fed into nand gate 172a on terminal 174a and into or circuit 176. Or circuit 176 produces an output on terminal 178 which is fed into monostable 180 producing a positive going pulse on terminal 182 which is fed back to nand gate 172a at terminal 184a and nand gate 186a at terminal 188a and all similar nand gates in this circuit corresponding to nand gates 172a and 186a.

The pulses produced on terminals 168a and 170a as well as the pulse produced on terminal 182 of monostable 180 are in fact coincident and when all three signals are present memory flip-flop 190a (in the dotted lines) is reset to produce an output on terminal 192a. This signal is coupled into and circuit 194a at terminal 196a. The signal on terminal 196a of and circuit 194a will remain as long as memory flip-flop 190 has been reset by an encroachment pulse.

The condition indicating pulse is also fed into safety margin detector 154a at terminal 198a. Similarly the appropriate crossover pulse signal is fed into terminal 200a of safety margin detector 154a.

Safety margin detector 154a functions as follows. Whereas the encroachment detector 156a produced an output pulse only in circumstances where the condition indicating pulse occured after a referenced crossover pulse, the safety margin detector produces an output pulse on terminal 202a only if the condition indicating pulse occurs before the referenced crossover pulse, indicating the presence of a safety angle. The pulse appearing on terminal 202a will commence at the beginning of the condition indicating pulse and cease with the occurrence of the referenced crossover pulse fed into terminal 200a, hence the duration of the pulse on terminal 200a is the actual safety margin and is designated safety margin pulse.

If a pulse exists on terminal 202a it is fed into terminal 204a of and circuit 194a. Because flip flop 190a has be previously set, an output pulse will be produced on output terminal 206a when a safety margin pulse is produced on terminal 202a. The pulse from terminal 206a will be fed into terminal 208a of or circuit 210. Or circuit 210 thence produces an output on terminal 212.

The circuit functions as follows.

Whenever any of the encroachment detectors 156 is actuated for example 156a, or circuit 160 produces a pulse on terminal 163 the length of which corresponds to the duration of encroachment. This signal may be used by the counter logic shown in FIG. 2 to increase the pulse rate at which pulses are counted into counter 38 so as to prevent future encroachment.

The actuation of encroachment detector 156a also serves to actuate or circuit 162a and monostable 166a, or circuit 176, monostable 180, nand circuits 172a and 186a, which resets memory flip-flop 190a to produce a continuous signal on terminal 196a of and circuit 194a as long as memory flip-flop 190a is reset.

Because or circuit 160 has signalled the counter logic that an encroachment has occurred, appropriate action has been taken to adjust the firing angles of the valves to prevent future encroachment and it will be found that the control circuit has functioned to increase the pulse rate to counter 38 to prevent further encroachment thus in future, a safety margin exists, for the valve which just experienced encroachment. As long as memory flip-flop 190a is reset, the safety margin detector 154a will function to provide a safety margin pulse in future after an encroachment of that particular valve has occurred. This action is accomplished by the use of and circuit 194a which receives a continuous signal on terminal 196a from memory flip-flop 190a which was reset and safety margin pulses from terminal 202a of safety margin detector 154a are fed into terminal 240a of and circuit 194a. The output pulses from and circuit 194a are fed into or circuit 210 on terminal 208a producing an output pulse on terminal 212.

It will be seen that in the instance described, if a pulse appears on terminal 212, the pulse corresponds to the safety margin (in duration) of the last valve to encroach.

If for some reason another valve should encroach during the period when flip-flop 190a was reset, say the detector 156b detects encroachment, whereupon a signal is fed into or circuit 160 and or circuit 162b, thus producing a signal at terminals 163 and 164b respectively. By the method previously described flip-flop 190b is now reset and flip-flop 190a is set because there is no signal on terminals 174a and 175a when monostable 180 produces its output pulse. Because monostable 166b is producing its two output pulses, monostable 180 is able to reset flip-flop 190b.

In this way only the proper memory flip-flop is reset and any other flip-flops previously reset are always set by the action of the next encroachment detection operation. After memory flip-flop 190b is reset, any pulses appearing on terminal 212 will be of a duration of the safety margin existing in the valve corresponding to the "b" circuitry.

The basic function will be restricted from increasing the firing angle by an amount greater than the safety margin of the reference valve by using the signal appearing on terminal 212 to limit the action of the control circuit. In this manner the excursion of firing pulses into the encroachment area is prevented once a particular valve has experienced encroachment and its reference flip-flop 190 is reset.

In actual operation of the control circuit, conditions may well exist where the control will be forced to drive the firing pulses to the point of encroachment and no doubt hold the pulses in this region for considerable lengths of time. During this time one or another of the memory flip-flops 190 will be in a reset condition. If however the control system decides to advance the firing angle because of some change in the basic function, a zero will be produced by the V-T Converter terminal 76 as shown in FIG. 4 and production of a zero on this terminal will be used to produce a pulse on terminal 220 of FIG. 10 which will reset all the memory flip-flops 190 of the control circuit, in fact making all valves reference valves in times when the firing angle is not near the encroachment region. It is in this operating condition that the control circuitry awaits the production of an encroachment pulse produced by one of the encroachment detectors 156.

Figure 11:
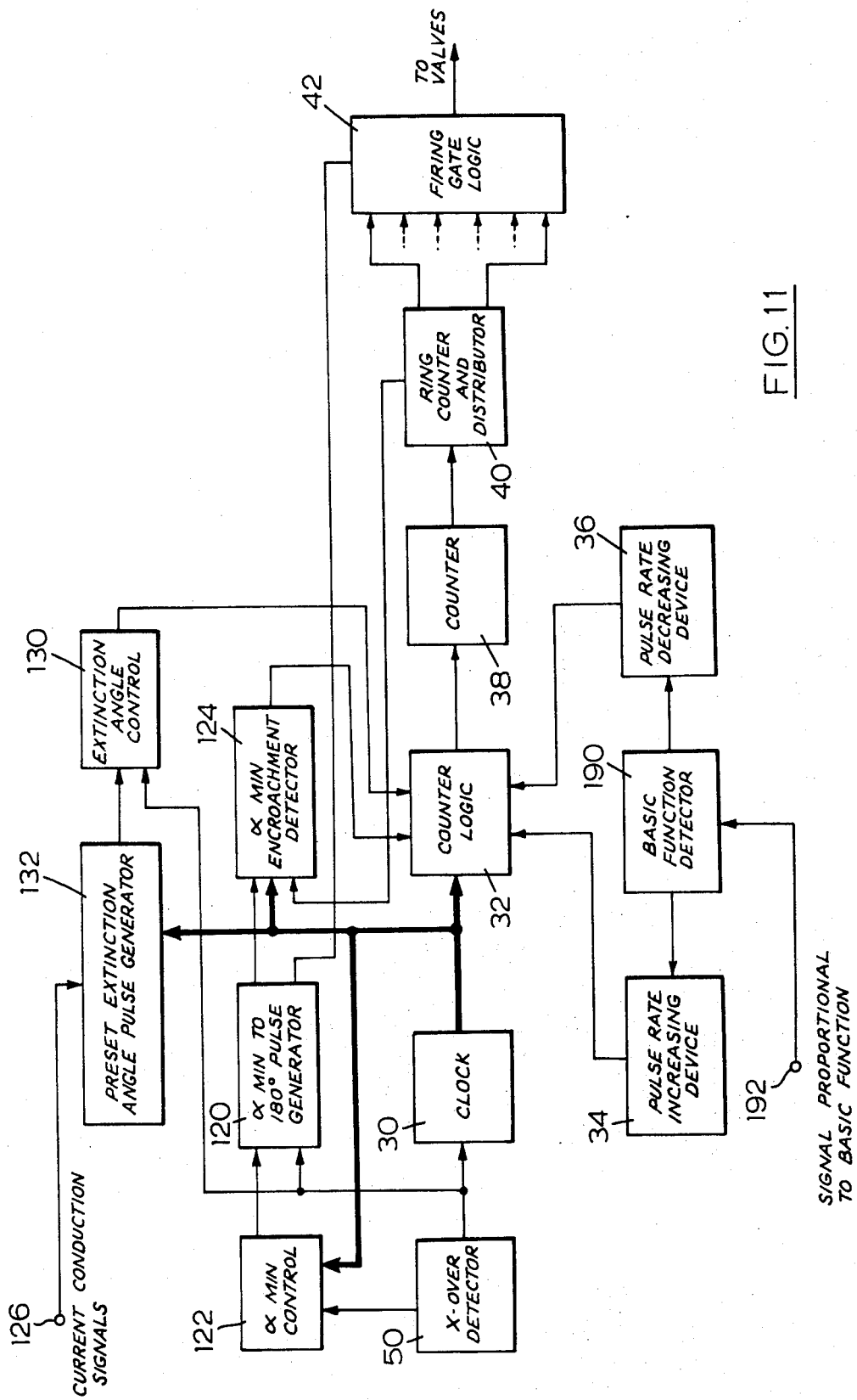
FIG. 11 is a block diagram of the complete control circuit of this system.

FIG. 11 illustrates the overall control circuit which results from the combination of all parts previously described. The only designations which have been changed are terminal 192 which is coupled to a signal which will be used to provide a control for the balance of the system and the reference to the basic function detector 190 which is essentially the control apparatus as shown in FIG. 4. Because of the previous detailed explanation of the apparatus, only a brief description of this device will be given.

The crossover detector 50 is used to control the clock frequency 30. Under steady state conditions, clock 30 provides pulses to counter logic 32 which are passed on to counter 38 and after a predetermined number of pulses have been counted, a ring counter advancing pulse is fed into ring counter and distributor 40 which will then initiate a firing pulse to one of the firing gates in firing gate logic 42.

If the signal fed into terminal 192 deviates from a preset reference valve by more than a predetermined amount, controlling function detector 190 takes appropriate action which will either increase the rate at which pulses are counted into counter logic 32 or decrease the pulse rate at which pulses are counted into counter logic 32 so as to shift the firing angle by increasing or decreasing the rate which pulses are counted into counter 38 in any given time.

The action of the controlling function detector 190 will be limited to certain regions of firing angle by the α min encroachment detector 124 and the extinction angle control 130, thus if controlling function detector 190 attempts to advance the firing angle too far the α min encroachment detector 124 assumes control and prevents the advancement of the firing pulse beyond a continually established safety operating point. Similarly, the extinction angle control will prevent the retardation of the firing pulses beyond a certain established point. Thus the extincution angle control 130 and the encroachment detector 124 provide assurrance that reliable commutation of the valves in the converter will be maintained.

SUMMARY

In summary, the circuitry provided in the aforementioned description may be used to control a converter acting either as a rectifier or inverter, and certainly if the device was to be used only for rectifier operation some of the control circuits may be deleted. Similarly other control circuits may be deleted if the device is to be used as an inverter. However, it is felt that the basic system of counting clock pulses in counter 38 is most valuable and this system will be used regardless of mode of operation.

The pulse rate increasing device may be a device which is capable of insertion of one or more pulses into the counter 38 by way of counter logic 32 between clock pulses. Similarly, the pulse rate decreasing device may block every clock pulse or every other clock pulse or some other multiple of clock pulses from the counter 32 for a period of time when called upon to delay the firing angle.

Also for purposes of description it has generally been assumed that the quantities α min and the preselectable delay "D" shown in FIG. 9A are constant although their values are preselected before operation has begun. In actual fact it may be advisable to vary either or both these quantities during operation if system conditions require such changes.

Other changes may be made in the logic circuitry used to detect α min encroachment, γ min encroachment, or to select a reference valve under encroachment conditions, however it is believed that the foregoing description is by way of example only and it is felt that this invention should be only restricted only by the scope of the following claims.

The embodiments of the invention in which an exclusive property or privilege is claimed are defined as follows:

1. A converter circuit for producing a constant magnitude variable duration electrical pulse in response to the amplitude of an input signal comprising:
   first means for feeding an input signal into said converter circuit,
   second means for producing a unipolar signal of constant polarity and of magnitude depending on the absolute magnitude of said input signal,
   circuit means producing an output electrical pulse of constant magnitude and variable duration the duration of said pulse varying directly with the amplitude of said unipolar signal.

2. A control circuit for electrical apparatus comprising:

sampling means for sampling a signal and producing a sample of said signal, said sample being fed into an amplifier, the output of which depends in polarity and magnitude upon the difference between said sample and a reference, polarity sensing means for producing a logical output signal which depends upon the polarity of said signal produced by said amplifier, variable length constant magnitude pulse producing means producing an output signal, the length of which corresponds to the absolute magnitude of the signal produced by said amplifier.

3. In a control circuit for an electrical apparatus;

sampling means for sampling a signal corresponding to a basic function, reference means producing a reference signal, amplification means for combining and amplifying the difference of the signal corresponding to the basic function and the reference signal, polarity detection means for producing a logical output signal which is determined by the polarity of the output signal produced by said amplifier, comparison means for comparing the absolute magnitude of said output signal from said amplifier with a reference signal, variable pulse length producing means for producing an output pulse which is of substantially constant magnitude and variable in length depending upon the absolute magnitude of said signal produced by said amplifier.

* * * * *